UNITED STATES PATENT OFFICE.

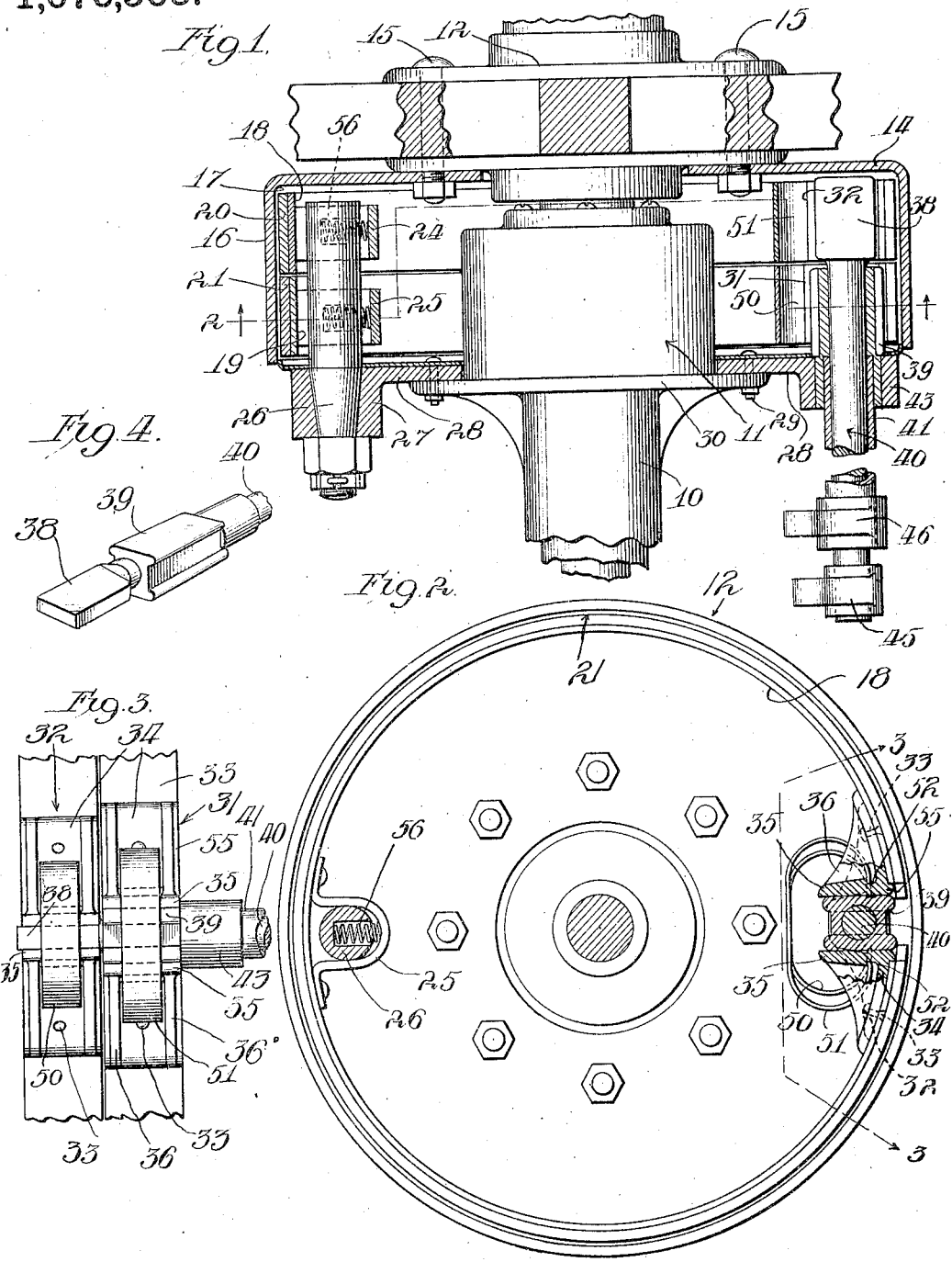

THOMAS I. DUFFY, OF CHICAGO, ILLINOIS, ASSIGNOR TO E. C. SALES CO., OF CHICAGO, ILLINOIS, A CORPORATION OF ILLINOIS.

BRAKE MECHANISM.

1,076,563.

Specification of Letters Patent.

Patented Oct. 21, 1913.

Application filed October 28, 1912. Serial No. 728,217.

*To all whom it may concern:*

Be it known that I, THOMAS I. DUFFY, a citizen of the United States, and a resident of Chicago, in the county of Cook and State of Illinois, have invented certain new and useful Improvements in Brake Mechanism; and I do hereby declare that the following is a full, clear, and exact description thereof, reference being had to the accompanying drawings, and to the characters of reference marked thereon, which form a part of this specification.

This invention relates to improvements in brake mechanism for motor vehicles and for analogous uses, and refers more specifically to internal brakes, wherein the brake band is located or contained within the drum carried by the vehicle wheel or other movable part and is provided with means for expanding the band outwardly into contact with the internal braking surface of the drum.

Among the objects of the invention is to improve and simplify brake mechanisms of this general character, and the invention consists in the matters hereinafter set forth and more particularly pointed out in the appended claims.

In the drawings:—Figure 1 is a view partly in elevation and partly in section of a motor vehicle rear axle and wheel provided with a brake mechanism embodying my invention. Fig. 2 is a section on the indirect line 2—2 of Fig. 1. Fig. 3 is a detail section on the indirect line 3—3 of Fig. 2. Fig. 4 is a perspective view of the angularly movable expander cams for expanding the brake bands.

As shown in the drawings, 10 designates the rear axle casing or housing that is formed with a chamber 11 to receive the anti-friction bearings between the driving shaft and the axle housing. The axle shown is of the semi-floating type, the driving shaft spindle carrying the wheel hub 12 exterior to the anti-friction bearings. It will be understood, however, that my improved brake mechanism may be applied to other forms of axles.
14 designates a brake drum that is attached, as by means of the bolts 15, 15 to the hub 12 and is provided with the usual cylindric flange 16 concentric with the driving shaft and which extends inwardly from the hub. The inner surface 17 of the drum constitutes a braking surface adapted for engagement with brake bands contained within said drum.

18, 19 designate brake bands within the drum, arranged one at the side of the other, and each adapted to operate against the inner braking surface of the drum. The said brake bands are provided at their exterior sides with the usual fabric or other friction faces 20, 21 adapted for direct contact with the interior braking face of the drum. The bands are provided intermediate their ends with loops or eyes 24, 25 through which extends an anchoring stud 26 that has bearing in a boss 27 of a torque arm 28 that is attached, as by means of bolts 29, to a flange 30 on the axle casing or housing 10. The ends of said brake bands at the open sides thereof are provided with lugs or fittings 31, 32 which are secured, as by means of the rivets 33, to the ends of the bands. The said lugs 31, 32 each comprises a curved base portion 34 that lies against and is attached to its band, an inwardly turned portion 35 and ribs 36, 36 connecting the base portion with the inwardly turned portions. The inwardly turned portions or flanges 35 of the lugs attached to the opposite ends of each band lie parallel with each other and are smooth on their inner or adjacent faces. One of the bands is shown as longer than the other band and the lugs of one pair are, therefore, spaced closer than those of the other pair. This construction provides a maximum braking contact and is made practicable by the operating devices hereinafter described.

The brake bands are adapted to be expanded outwardly into their braking positions by means of expander members or cams 38, 39, of rectangular cross section, arranged one between each pair of lugs. The expander member or cam 38 is formed upon or constitutes an enlargement of a rock shaft 40, while the expander member or cam 39 is formed upon or constitutes an enlargement of a tubular rock shaft 41 that surrounds and constitutes the bearing for the rock shaft 40; said tubular rock shaft being in turn mounted to rock in a boss or sleeve 43 formed on the adjacent end of the torque arm 28. The said solid rock shaft 40 is angularly movable on its axis relatively to and independently of the tubular rock shaft 41 and said rock shafts are adapted to be so angularly operated by means of crank arms 45, 46 attached thereto. Said crank arms are adapted for connection in any suitable manner with forwardly extending operating connections, not shown. Each pair of said lugs at the ends of the brake bands is held up against its coöperating expanding member or cam by means of spring devices which serve to close or contract the brake bands when braking pressure is released and also to hold the parts together and prevent them from rattling. As herein shown, these spring devices have the form of C-shaped springs 50, 51, the ends of which engage into notches 52 formed on the exterior sides of the flanges 35. When the rock shafts 40 and 41 are turned on their axes, the said expander members or cams are angularly displaced and, by reason of their rectangular cross section, spread or force the lugs apart, with the result of expanding the brake bands with their friction faces or surfaces in contact with the braking surfaces of the drum.

When it is desired to apply a service stop or brake to the vehicle, one of the rock shafts, as the solid rock shaft 40, is angularly turned to angularly displace the expander member or cam 38 to thereby expand its coöperating brake band. If it be desired to apply an emergency stop or brake, both rock shafts will be angularly turned simultaneously so as to throw both pairs of brake bands connected thereto outwardly in their braking positions.

In order to provide a reliable and durable connection between the brake bands and their expander lugs or fittings, and to avoid shearing stress being brought upon the rivets 33 that connect the lugs to said brake bands, said lugs are provided with short lips 55 which are fitted against the end edges of the brake bands, as more clearly indicated in Fig. 2. With this construction, when said fittings are pressed outwardly by the expander members or cams, the expansive force is transmitted through said lips. Therefore, the only duty imposed upon the said rivets 33 is that of holding said lugs or fittings on the bands.

In order to hold the brake bands in place within the drums when in their non-braking positions and prevent the parts from rattling, I may interpose yielding means or cushions between the anchor studs 26 and the closed parts of the loops or eyes 24, 25. As herein shown, the said anchor studs are provided with recesses or sockets to receive coiled expansion springs 56 which bear against the bottoms of the recesses or sockets, and said closed parts of the loops or eyes 24, 25. When the brake bands are expanded they are expanded against the action of said springs 56.

If desired the brake bands may be split or divided in the manner shown in pending application for U. S. Letters Patent, Serial No. 728,216 filed of even date herewith, in order to enable the pressure of said bands to be equalized transversely across the braking face of the drum.

I claim as my invention:—

1. An internal brake mechanism for vehicles comprising, in combination with a brake drum having an internal braking face, two transversely split brake bands therein, arranged side by side each band consisting of a continuous band split at one point only and the split point of both bands coinciding, lugs attached to the ends of the said bands, and provided with parallel, opposing faces, axially alined expander members of oblong cross section between said lugs, means for separately rocking the said expander members, a fixed anchor stud, the bands being provided with loops to fit over said stud, and springs between said stud and said loops.

2. An internal brake mechanism for vehicles comprising, in combination with a brake drum having an internal braking face, two transversely split brake bands therein, arranged side by side, lugs attached to the ends of said bands, and provided with parallel, opposing faces and on their inner faces with notches, axially alined expander members of oblong cross section between said lugs, means for separately rocking said expander members and C-shaped springs engaging over said lugs with the ends thereof biting into said notches to hold the lugs against said expander members.

3. An internal brake mechanism for motor vehicles comprising, in combination with a brake drum having an internal braking face, a transversely split brake band therein, lugs attached to the ends of said band and provided with opposing parallel faces, a rocking expander member of oblong cross section between and acting on the inner faces of said lugs, with means to rock the same, and a C-shaped spring embracing said lugs, the lugs being provided on their sides opposite to the expander member engaging faces with notches to receive the ends of said spring.

4. An internal brake mechanism for motor vehicles comprising, in combination with a brake drum provided with an internal braking face, a transversely split brake band therein, lugs attached to the ends of said band and provided with opposing parallel faces, a rocking expander member of oblong cross section between and acting on said faces of the lugs, with means for rocking the same, and yielding means for holding the lugs pressed against said expander member, said lugs being riveted to the brake band, and being provided with lips which overlap the end margins of the brake band, for the purpose set forth.

In testimony, that I claim the foregoing as my invention I affix my signature in the presence of two witnesses, this 18th day of October, A. D. 1912.

THOMAS I. DUFFY.

Witnesses:
W. L. HALL,
G. E. DOWLE.